US009411967B2

(12) United States Patent
Parecki et al.

(10) Patent No.: US 9,411,967 B2
(45) Date of Patent: Aug. 9, 2016

(54) SYSTEMS AND METHODS FOR MANAGING LOCATION DATA AND PROVIDING A PRIVACY FRAMEWORK

(71) Applicant: Environmental Systems Research Institute (ESRI), Redlands, CA (US)

(72) Inventors: Aaron D. Parecki, Portland, OR (US); Amber L. Case, Portland, OR (US); Wayne Chambliss, Portland, OR (US)

(73) Assignee: Environmental Systems Research Institute (ESRI), Redlands, CA (US)

( * ) Notice: Subject to any disclaimer, the term of this patent is extended or adjusted under 35 U.S.C. 154(b) by 0 days.

(21) Appl. No.: 14/010,022

(22) Filed: Aug. 26, 2013

(65) Prior Publication Data

US 2014/0059695 A1    Feb. 27, 2014

Related U.S. Application Data

(60) Provisional application No. 61/693,167, filed on Aug. 24, 2012.

(51) Int. Cl.
*G06F 7/04*  (2006.01)
*G06F 21/60* (2013.01)
(Continued)

(52) U.S. Cl.
CPC ............... *G06F 21/60* (2013.01); *G06F 3/048* (2013.01); *G06F 17/3087* (2013.01); *G06F 17/30241* (2013.01); *G06F 21/6245* (2013.01);
(Continued)

(58) Field of Classification Search
CPC ............ G06F 21/60; G06F 21/6245; G06F 2221/2101; H04L 63/0421; H04L 63/102

USPC .......................................................... 726/26
See application file for complete search history.

(56) References Cited

U.S. PATENT DOCUMENTS 6,311,069 B1   10/2001   Havinis et al.
6,360,102 B1    3/2002   Havinis et al.
(Continued)

FOREIGN PATENT DOCUMENTS

WO      2011094763 A1    2/2011

OTHER PUBLICATIONS

Carmen Ruiz Vicente, "Location-Related Privacy in Geo-Social Networks", May/Jun. 2011 IEEE, pp. 20-27.*
(Continued)

*Primary Examiner* — Samson Lemma
(74) *Attorney, Agent, or Firm* — Kilpatrick Townsend & Stockton LLP

(57) ABSTRACT

A computer-implemented method includes providing a user interface on an internet-protocol (IP) connected mobile device, the user interface configured to receive a user input corresponding to one or more data privacy parameters for geo-location data, and controlling a transferring of geo-location data to and from each of a plurality of mobile applications on the mobile device based on the user input. A change in one or more of the data privacy parameters can change how geo-location data is provided to each of the plurality of applications and can affect location data accuracy, location data reporting frequency, geo-functions, and more. The user interface can be configured to allow a user to view, manage, and delete a personal location history. Furthermore, one or more profiles can be associated with one or more of the plurality of mobile applications, where each of the one or more profiles is assigned individual data privacy parameters.

20 Claims, 14 Drawing Sheets

(51) Int. Cl.
| | |
|---|---|
| *G06F 21/62* | (2013.01) |
| *H04W 4/02* | (2009.01) |
| *H04W 8/16* | (2009.01) |
| *G06F 17/30* | (2006.01) |
| *G06F 3/048* | (2013.01) |
| *H04L 29/06* | (2006.01) |

(52) U.S. Cl.
CPC ............. *H04L63/102* (2013.01); *H04W 4/02* (2013.01); *H04W 8/16* (2013.01); *G06F 2221/2101* (2013.01); *G06F 2221/2111* (2013.01); *H04L 63/0421* (2013.01)

(56) References Cited

U.S. PATENT DOCUMENTS

| | | | |
|---|---|---|---|
| 6,662,014 B1 | 12/2003 | Walsh | |
| 6,714,790 B2 | 3/2004 | Heckard et al. | |
| 7,023,828 B2 | 4/2006 | Korus et al. | |
| 7,024,409 B2 | 4/2006 | Iyenger | |
| 7,054,648 B2 | 5/2006 | Abtin et al. | |
| 7,088,989 B2 | 8/2006 | Guo | |
| 7,185,204 B2 | 2/2007 | Narayanaswami et al. | |
| 7,246,231 B2 | 7/2007 | Tariq et al. | |
| 7,401,233 B2 | 7/2008 | Duri et al. | |
| 7,403,785 B2 | 7/2008 | Daniels et al. | |
| 7,426,746 B2 | 9/2008 | Mononen et al. | |
| 7,493,211 B2 | 2/2009 | Breen | |
| 7,496,191 B1 | 2/2009 | Crews et al. | |
| 7,503,074 B2 * | 3/2009 | Dublish et al. | 726/27 |
| 7,512,405 B2 | 3/2009 | Walsh | |
| 7,748,026 B1 | 6/2010 | Lee et al. | |
| 7,756,534 B2 | 7/2010 | Anupam et al. | |
| 7,774,227 B2 | 8/2010 | Srivastava | |
| 7,848,765 B2 | 12/2010 | Phillips et al. | |
| 7,899,706 B1 | 3/2011 | Stone et al. | |
| 7,996,247 B1 | 8/2011 | Kobori et al. | |
| 7,999,670 B2 | 8/2011 | McClellan et al. | |
| 8,019,532 B2 | 9/2011 | Sheha et al. | |
| 8,041,648 B2 | 10/2011 | Rossmark et al. | |
| 8,050,690 B2 | 11/2011 | Neeraj | |
| 8,060,389 B2 | 11/2011 | Johnson | |
| 8,140,265 B2 | 3/2012 | Grush | |
| 8,170,580 B2 | 5/2012 | Dingler et al. | |
| 8,180,326 B2 | 5/2012 | Hahn et al. | |
| 8,856,939 B2 * | 10/2014 | Cai et al. | 726/26 |
| 2005/0060575 A1 | 3/2005 | Trethewey et al. | |
| 2006/0136999 A1 | 6/2006 | Kreyscher et al. | |
| 2006/0270421 A1 | 11/2006 | Phillips et al. | |
| 2008/0094230 A1 | 4/2008 | Mock et al. | |
| 2010/0010740 A1 * | 1/2010 | Nachman et al. | 701/214 |
| 2010/0015951 A1 | 1/2010 | Hahn et al. | |
| 2010/0024042 A1 * | 1/2010 | Motahari et al. | 726/26 |
| 2010/0064373 A1 | 3/2010 | Cai et al. | |
| 2010/0077484 A1 | 3/2010 | Paretti et al. | |
| 2010/0197318 A1 * | 8/2010 | Petersen et al. | 455/456.1 |
| 2010/0203901 A1 | 8/2010 | Dinoff et al. | |
| 2010/0233999 A1 | 9/2010 | Loeb et al. | |
| 2011/0072034 A1 | 3/2011 | Sly et al. | |
| 2011/0083101 A1 | 4/2011 | Sharon et al. | |
| 2011/0142016 A1 | 6/2011 | Chatterjee | |
| 2011/0256881 A1 | 10/2011 | Huang et al. | |
| 2011/0263240 A1 | 10/2011 | Featherstone et al. | |
| 2011/0283336 A1 | 11/2011 | Lange et al. | |
| 2012/0009897 A1 | 1/2012 | Kasad et al. | |
| 2012/0009900 A1 | 1/2012 | Chawla | |
| 2012/0064920 A1 | 3/2012 | Shaw | |
| 2012/0126974 A1 | 5/2012 | Phillips et al. | |
| 2012/0129553 A1 | 5/2012 | Phillips et al. | |
| 2012/0192247 A1 | 7/2012 | Oliver et al. | |
| 2012/0331561 A1 * | 12/2012 | Broadstone et al. | 726/26 |
| 2013/0298248 A1 * | 11/2013 | Boldrev et al. | 726/26 |
| 2014/0082743 A1 * | 3/2014 | Niemenmaa et al. | 726/26 |

OTHER PUBLICATIONS

International Search Report and Written Opinion for International Application No. PCT/US2013/056671, mailed Feb. 14, 2014, 13 pgs.
International Preliminary Report on Patentability for International Application No. PCT/US2013/056671, mailed Mar. 5, 2015, 7 pgs.
Extended European Search Report corresponding to EP1376230.5 dated May 4, 2016 (8 pages).

* cited by examiner

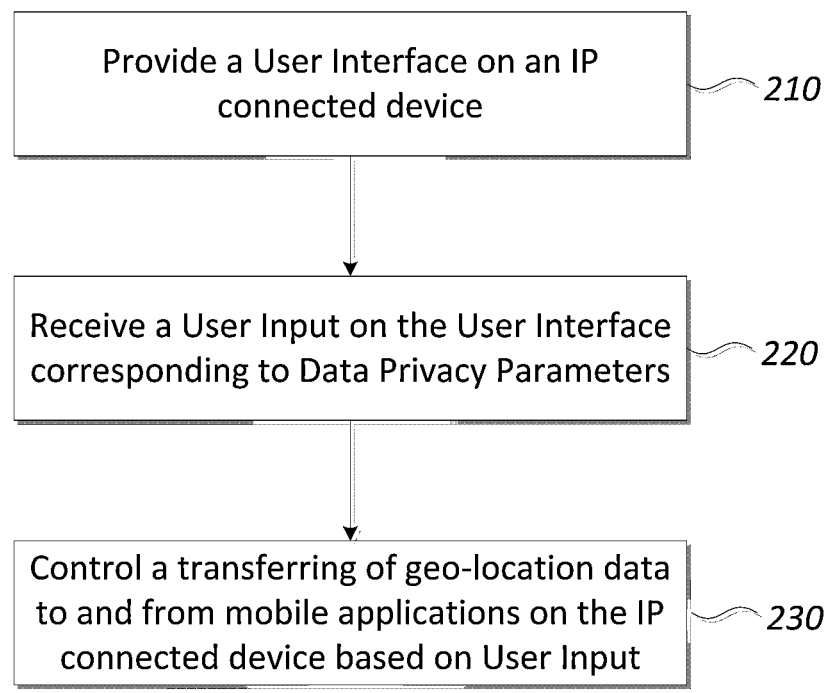

Privacy and Permissions http://sampleurl.com

Privacy and Permissions: 3rd Party Apps and Places

[ Edit places ]  [ Revoke access ]

310 — Reminder App

Has access to your location at the following places to deliver reminders

- [X] {{Brand}} Store — *All* {{Brand}} stores in Portland, OR (change)
- [X] Grocery Store — *Only* at 555 State St. Portland, OR (change)
- [ ] Drugstores — *Anywhere* in the United States (change)
- [X] Clothing Store — *Anywhere* in Portland, OR (change)

320 — Tourism App

Sends location-based messages pertaining to information about place-based information around you, including parks, buildings, points of interest, art and history.

- [X] Anywhere — Global Access (edit)

Frequency Settings

(●) all    ( ) 10 per day    ( ) weekly

[ Modify place categories        > ]

330 — Automation App

Has access to your location at the following places: for the purpose of turning on and off appliances when you enter or leave a location.

- [X] Home — 555 5th Ave. Seattle, WA (edit)
- [ ] Office — 101 5th Ave. Seattle, WA (edit)

App Catalog

Sort by: [App Rating] [Battery Life] [Privacy Rating] [Most Popular]

10 of 155 results   1 2 3 4 ... 6 7

---

1040 — Grocery App
Leave your shopping list at the market and get it when you arrive. Uses and stores your location when you enter specific listed stores.

1020 —     — 1030

---

1050 — Home Automation App
Has access to your location at the following places: for the purpose of turning on and off the lights when you enter or leave your home.

   

1010 — 

---

1060 — Wikipedia App
Global app that uses your location to deliver you Wikipedia articles near you.

   

Places and History
A list of the places you've been and the times you've been at them.
[ Delete Place ]   [ Delete History ]
1610 — ☐ Palio's Coffee Shop *(click to edit)*
   Created 2011-02-27 01:09:16
   45.50827, -122.648776
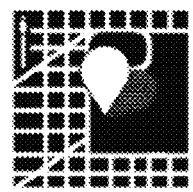
1620 — History
   ☐ 4/09   4:18pm to 12:18am   8hrs
   ☐ 3/27   10:00pm to 1:00am   3hrs
---
1610 — ☐ Water Avenue Coffee *(click to edit)*
   Created 2011-02-05 00:10:36
   45.51516, -122.66546
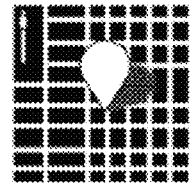
1620 — History
   ☐ 4/13   8:33pm to 9:00pm   27min
   ☐ 4/08   5:00pm to 7:00pm   2hrs
---
1610 — ☐ Unnamed Place *(click to edit)*
   Created 2011-02-05 00:10:36
   45.51516, -122.66546
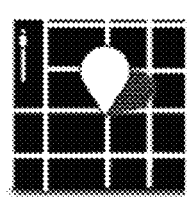
1620 — History
   ☐ 4/13   8:00pm to 12:00am   4hrs
   ☐ 4/08   8:44pm to 9:00pm   16min
1600
*FIG. 16*

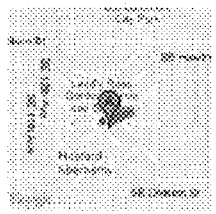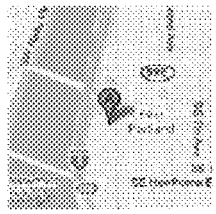
FIG. 17

SYSTEMS AND METHODS FOR MANAGING LOCATION DATA AND PROVIDING A PRIVACY FRAMEWORK

CROSS-REFERENCES TO RELATED APPLICATIONS

This application claims priority to U.S. Provisional Patent Application No. 61/693,167, filed Aug. 24, 2012, the entire contents of which are herein incorporated by reference in their entirety for all purposes.

BACKGROUND

As technology has advanced us into the information age, vast amounts of information, including location data, are stored in devices and servers around the world. Location information is a critical component of mobile applications today and can provide location-aware applications with more contextual relevance for consumers, application developers and marketers. As such, user connectivity and social networking are growing at unprecedented levels. However, while the sheer amount of data has rapidly increased, technological advancements by way of control over such data have lagged. As a result, people feel like they have less control than ever over their personal information.

BRIEF SUMMARY

In certain embodiments, a computer-implemented method includes providing a user interface on an internet-protocol (IP) connected mobile device, the user interface configured to receive a user input corresponding to one or more data privacy parameters for geo-location data, and controlling a transferring of geo-location data to and from each of a plurality of mobile applications on the mobile device based on the user input. A change in one or more of the data privacy parameters can affect how geo-location data is provided to each of the plurality of applications.

In some embodiments, data privacy parameters can affect one or more of location data accuracy, location data reporting frequency, or geofunctions including geofencing, geocoding, geotriggers, geoenrichment, geocloaking, and more. The controlling of transferring geo-location data can include selectively disabling location tracking for one or more mobile applications for a predetermined period of time or controlling a granularity or resolution of personal data associated with the geo-location data. In some instances, personal data can be anonymized, aggregated, or a combination thereof. The user interface can be configured to allow a user to view, manage, configure, and delete a personal location history. Furthermore, one or more profiles can be associated with one or more of the plurality of mobile applications, where each of the one or more profiles is assigned individual data privacy parameters.

In certain implementations, a computer-implemented system includes one or more processors and one or more non-transitory computer-readable storage mediums containing instructions configured to cause the one or more processors to perform operations including providing a user interface on an internet-protocol (IP) connected mobile device, the user interface configured to receive a user input corresponding to one or more data privacy parameters for geo-location data, and controlling a transferring of geo-location data to and from each of a plurality of mobile applications on the mobile device based on the user input.

In some embodiments, a non-transitory computer-program product, embodied in a machine-readable non-transitory storage medium, including instructions configured to cause a data processing apparatus to provide a user interface on an internet-protocol (IP) connected mobile device, the user interface configured to receive a user input corresponding to one or more data privacy parameters for geo-location data, and control a transferring of geo-location data to and from each of a plurality of mobile applications on the mobile device based on the user input.

BRIEF DESCRIPTION OF THE DRAWINGS

FIG. 2 is a simplified flow diagram illustrating a method of managing data privacy parameters, according to an embodiment of the invention.

FIG. 3 is a simplified diagram illustrating a user interface for managing data privacy parameters for third party applications, according to certain embodiments of the invention.

FIG. 10 is a simplified diagram illustrating an example of an application management interface, according to certain embodiments of the invention.

FIG. 16 is a simplified diagram illustrating a user interface depicting a user location history, according to certain embodiments of the invention.

FIG. 17 illustrates a user interface depicting a location history in a web-based browser, according to certain embodiments of the invention.

DETAILED DESCRIPTION

Figure 1:
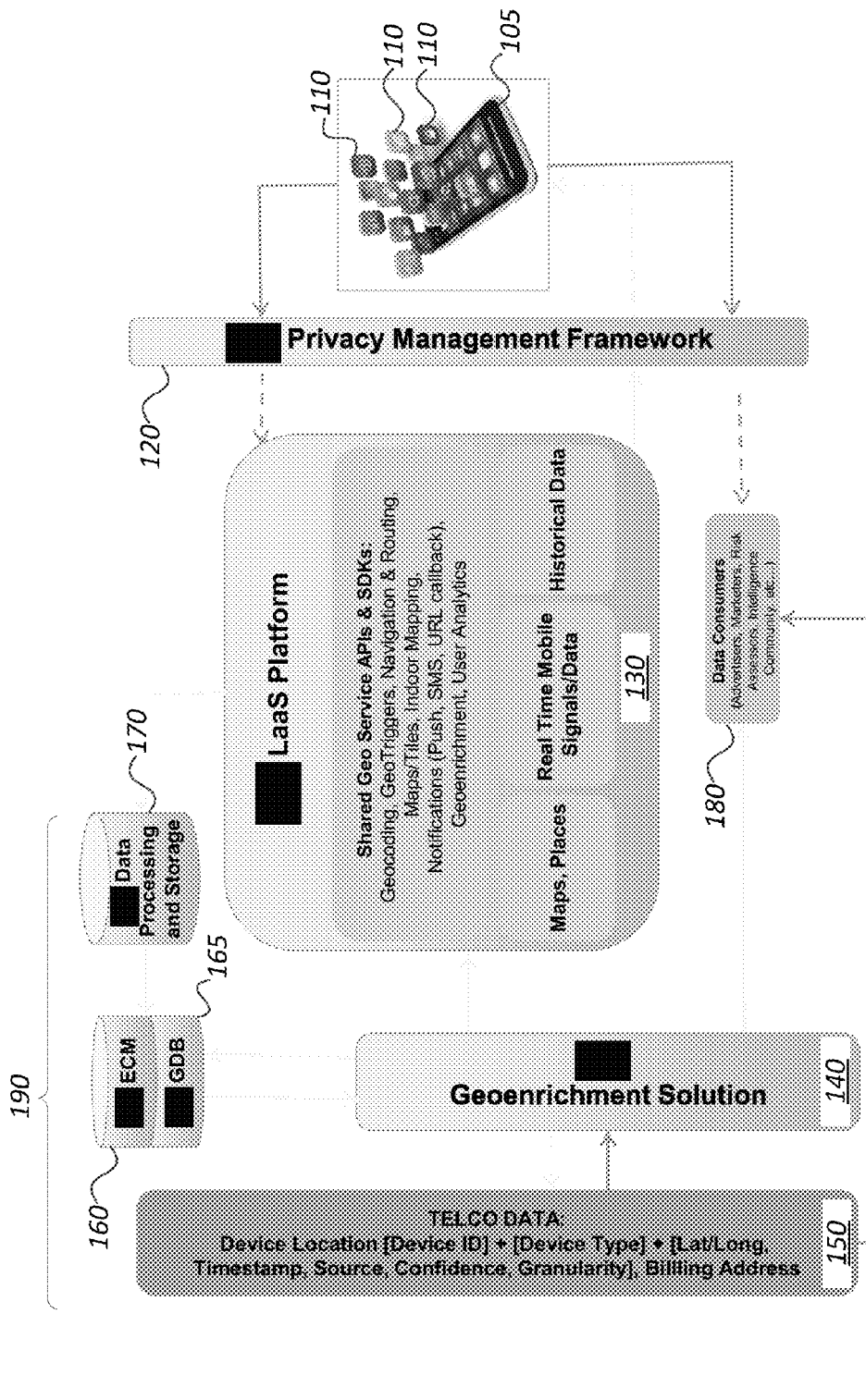
FIG. 1 is a simplified diagram illustrating a system 100 for managing data privacy parameters in geolocation data in GIS-based systems, according to an embodiment of the invention.

Embodiments of the invention relate to a system and method of managing privacy and controlling user and third party access to location data in the context of internet-protocol (IP) connected devices.

In certain embodiments, a computer-implemented method includes providing a user interface on an internet-protocol (IP) connected mobile device, the user interface configured to receive a user input corresponding to one or more data privacy parameters for geo-location data, and controlling a transferring of geo-location data to and from each of a plurality of mobile applications on the mobile device based on the user input. A change in one or more of the data privacy parameters can affect how geo-location data is provided to each of the plurality of applications. In some embodiments, systems and methods are configured to manage location data whereby end users, as well as other data stakeholders, are afforded the ability to set permissions, control privacy, and opt into systems requiring the use of geolocation data from an IP-connected device. This level of control can help reduce the liability of third parties when handling or accessing end user data, while increasing end user privacy and awareness of how their location-related data is accessed and used by others. In some implementations, location data can be shared with and accessed by friends (and other social actors) to facilitate communication of sensitive personally identifiable information ("PII"), including location data, with other individuals and groups of users, as well as with third parties. Some types of personally identifiable information can include geo-location information at a granular or non-granular level. For example, this can include sharing raw latitude/longitude coordinates, city, country, county, specific place names, future or past locations, and any other significant location update at a resolution defined by the user. This information can be shared at will, scheduled in advance, and/or triggered by a set of user entered-rules or code.

A user interface (e.g., control panel) can be used to set and manage the permissions for PII on web, mobile, and IP connected devices. In some embodiments, a privacy provisioning portal (e.g., task manager or control panel) may include a server architecture for permissioning, deleting, and/or forwarding on permissions powered by a back-end private interface and/or cloud platform. In such cases, stored user information (e.g., on a server) changes according to the specifications of the privacy management system. Permissioning can include viewing, storing, consuming, responding to, and modifying privacy considerations on an IP-connected device.

The location privacy framework used to implement and manage privacy management can include a user-facing framework that enables consumers to better manage the privacy of their location data across applications and providing users control of location data accuracy reported to specific applications, control of a frequency for reporting location data to approved entities, an ability to selectively disable location tracking for ad-hoc or prescheduled periods of time, viewing and deleting personal location history, and more. Certain implementations may utilize a set of APIs exposing user privacy parameters to application developers, such that the application may abide by the rules set by the end user. In such cases, if the API's are pre-installed on all devices by a carrier, they can offer a Telco-Certified application program that provides end-user with a comfort level that apps bearing that certification will abide by their data privacy parameters.

System Architecture

FIG. 1 is a simplified diagram illustrating a system 100 for managing privacy parameters in geolocation data in GIS-based systems, according to certain embodiments of the invention. System 100 includes an internet-protocol (IP) connected device 105 connected to both Location-as-a-Service (LaaS) platform 130 and Geoenrichment platform 190 through the privacy management framework 120. Device 105 can be a mobile phone, notebook computer, tablet computer, netbook computer, personal digital assistant (PDA), or any suitable IP-connected device. Mobile applications 110 are installed on device 105 and operate to initiate the geo-location functions (e.g., navigation, geoenrichment, geocoding, etc.) described herein.

Privacy management framework (privacy framework) 120 functions as a gateway for which geo-location data is regulated, filtered, and/or managed to control how data is delivered to and from device 105. Privacy framework 120 can include a user interface (not shown) configured to receive a user input corresponding to one or more data privacy parameters for geo-location data, and controlling a transferring of geo-location data to and from each of a plurality of mobile applications 110 on mobile device 105 based on the user input. The user interface can be a control panel, task manager, or other suitable interface to allow a user to manage data privacy parameters for geo-location data. Furthermore, privacy framework 120 can manage other data types that can be parameterized, as would be appreciated by one of ordinary skill in the art.

Privacy framework 120 can be reside and operate on the IP connected device 105. In certain embodiments, privacy framework 120 and the user interface is implemented on device 105 as a mobile application configured to manage the flow of geo-location data and related data types. In some embodiments, device 105 provides a user interface for managing data privacy parameters, but operates as a privacy provisioning portal with the functional implementation of management operations moved to a back-end offboard server architecture or cloud platform. There are many possible implementations and hybrid manifestations of a privacy management framework as described herein and would be understood by one of ordinary skill in the art with the benefit of this disclosure.

In some implementations, privacy framework 120 not only operates to control and regulate the flow of geo-location data to and from mobile applications residing on device 105, but also to mobile applications (or other destinations) residing on other devices. For example, in a machine-to-machine (M2M)

communication, a first user on a first mobile device may wish to track the location of a second mobile device. By leveraging the functions of privacy framework 120, the second mobile device may be configured to limit the access of the first user by changing the resolution of the location accuracy, changing the frequency of the location report out, or preventing location access altogether, among other settings. Similarly, the first mobile device can be configured to control how the location is used and received using privacy framework 120. For example, the first mobile device can be configured to only request location information from the second mobile device during certain times of the day. Some of the myriad implementations or privacy management are further discussed below.

Privacy framework 120 can sit at the frontend of a multi-input, multi-output system that includes components for data storage; archive and retrieval; data analysis; geo-processing; geo-enrichment; and other tasks corresponding to the inhalation of location data, its contextualization with data of other types, and the exhalation of some combined product. In such a system, the components can obey a flexible schema of rules for how they interoperate on the basis of user inputs into the Privacy Management Framework. The sample interfaces included here are intended to demonstrate the sorts of inputs and outputs a user might expect to see on a smartphone-based PMF application interface. They are also suggestive of the underlying schema of rules for how the system handles data inhalation, storage, and output to recipients other than the user (e.g., social media contacts of the user, or a mobile ad exchange). Each interactive field, GUI button, etc., can correspond to the backend operation of one or more components of the system involved in the collection, aggregation, analysis, geo-enrichment, and identification/de-identification of consumer location data and its contextualization (cartographic or otherwise) with other data types.

Referring back to FIG. 1, Privacy Management Framework (PMF) 120 can be an interface that connects into, but is not limited to, the following items: IP connected devices (e.g., owned by ESRI, Inc.), end users, third party devices owned by customers (e.g., organizations, developers and individuals) GIS services online, on behind-the-firewall servers, remote servers, on-site servers, mobile devices and individual services running on those systems. PMF 120 can be configured to connect across any existing and new (e.g., ESRI, Inc.) services including, but not limited to, maps, places, real time mobile signals/data, and data and other systems provided by third party providers including, but not limited to, Telco information, advertisers, risk assessors, geoenrichment providers, data providers and more (e.g, any existing and future ESRI partners and partners of ESRI partners). This can include real-time and historical data. In some aspects, a PMF's objective is to offer a user interface for a variety of audiences, from, but not limited to, internal administrators (e.g., from ESRI), sales, marketing and developers, distributors, third party providers and partners, customers, end users, organizations and developers and data consumers. Said parties can use the full functionality of the PMF or a subset thereof to manage data, privacy, permission and other actions relating to how data is stored, accessed, etc., in systems owned by ESRI, third parties, customers, organizations, developers and end users, and the like.

In some implementations, the user interface can be used to control the length of time that data is stored (e.g, geolocation data, PII data, etc.), what type of data is stored, and the levels of permissions associated therewith. The user interface can connect into back-end systems and data storage layers, irrespective of infrastructure ownership (e.g., whether owned by ESRI or external parties). PMF 120 can be modularized so that parties may use all or some of the components for their specific solution. In some embodiments, PMF 120 can be exposed through internal services, external services, or packaged so that organizations, developers and third parties can expose it to their own group or to end users. PMF components can be exposed on any IP connected device including mobile, or as a library added to an existing or new mobile application, server stack, web app, hardware system, sensor, or other device as would be appreciated by one of ordinary skill in the art with the benefit of this disclosure.

In certain embodiments, profiles can be associated with individual users, groups, organizations, or other entities that have access to geolocation data. For example, an owner or user of an IP connected device 105 may utilize the user interface of privacy management framework 120 to create a profile for herself assigning unlimited access to geo-location data generated by that particular device. The owner may create a second profile for a third-party with limited access to geolocation data by allocating the appropriate values to the data privacy parameters associated with a third-party. Other methods in addition to, or in lieu of, user profiles may be used as would be understood by one of ordinary skill in the art.

System 100 further includes geolocation-based platforms 190, which are accessible by IP connected device 105 through privacy management framework 120. Geolocation-based platforms 190 can include Location-as-a-Service (LaaS) platform 130 and geoenrichment platform 190. LaaS 130 can perform services such as geocoding, establish geotriggers, perform navigation and routing, generate maps and tiles, perform indoor mapping, manage notifications (e.g., push, SMS, URL callback), perform geo-enrichment functions, provide user analytics applications, and more. LaaS platform 130 may include additional modules for maps and places, real-time mobile signals data, and historical data (e.g., location history). LaaS 130 can include any suitable configuration of networks, servers and infrastructure to perform its various functions, as would be appreciated by one of ordinary skill in the art with the benefit of this disclosure. In some embodiments, LaaS 130 can perform some or all of the geolocation-based functions described herein, wherein the extent that the geolocation data is utilized and/or accessible is controlled by privacy management framework 120.

Geolocation-based platforms 190 can further include geo-enrichment platform 190, which may include modules to implement geo-enrichment solutions (e.g., geo-enrichment solution 140), which are further described below. Geo-enrichment platform 190 includes a data processing and storage module 170, enterprise content management (ECM) module 160, a geo-database module (GDB) 165, telecommunications company (Telco) data 150, geo-enrichment solution module 140, and data consumers 180. The operation, architecture, and processes involved in LaaS and geoenrichment systems would be appreciated by one of ordinary skill in the art with the benefit of this disclosure. In some embodiments, the LaaS platform 130 and geolocation-based platform 190 are operated and maintained by Environmental Systems Research Institute, Inc. (ESRI) of Redlands, Calif.

In certain embodiments, the Privacy Management Framework functions as a permission management interface and dashboard for a Location Based Services (LBS) Platform. A cloud-based Location-as-a-Service (or LaaS) is one implementation scenario for this Platform. Others can include implementations for desktop computing, server-side computing, private clouds, data appliances, or any hybrid thereof. In any implementation, a shared Geo Service product (e.g., APIs, SDKs, Geocoding, Map Tiles, etc) can be managed by the Privacy Management Framework interface. This interface can be applied to multiple owners, users and third parties affiliated with the LBS platform services.

As discussed above, privacy management framework 120 can be used to manage data privacy parameters to control the sharing of geo-location data. Privacy parameters can be configured to control aspects of geo-fencing, geocoding, geotriggers, geoenrichment, geocloaking, location data accuracy, location data reporting frequency, selective disabling, location granularity, personal location history, pattern recognition, and more, as would be appreciated by one of ordinary skill in the art. An employee, third party customer, administrator, end user or company can use the dashboard to manage privacy at the individual, organizational or group level. An end user could use Privacy Management Framework 120 interface to determine which advertisers have access to what parts of their PII data, at what points in time, and at what level of detail, or opt out entirely. Privacy Management Framework 120 can connect through the LBS (LaaS, etc.) platform so that rules set up in the interface can affect how data is processed or stored, how a service functions and how a low level data source such as Telco data or a service add-on such as Geoenrichment can be used, stored, or discarded or affiliated with end user, organization or group data.

Geofencing can be virtual perimeters applied to a real-world geographic area. For example, geo-fences can be configured as a predefined set of boundaries, such as at school attendance zones, restricted areas, neighborhood boundaries, and the like. Geo-fences can also be dynamically generated and may be defined by a given radius around a store, vehicle, or point location, etc. Conventionally, when a location-aware computing device (e.g., IP connected device 120) of a location-based service user enters or exits a geo-fenced area, the computing device typically receives a generated notification (e.g., push messaging, e-mail, SMS messaging, twitter feed, etc.) that may provide information about the location of the computing device, information related to the location of the computing device, or other type of message, cue, or indication as would be known by one of ordinary skill in the art. For example, some applications may include commercial services (e.g., alerting the user to an on-going sale at a nearby department store), emergency or security services, or any desired application. Alternative embodiments can include generating notifications when a computing device leaves the geo-fenced area (e.g., alerting parents when a child leaves a designated area, etc.). In some cases, geo-fences can be customizable, allowing users of the geo-fencing systems to establish zones around places of work, customer's sites, secure areas, and the like. In some embodiments, privacy management framework 120 can be accessed by IP connected device 105 to set privacy parameters to control how geolocation data is used in creating, accessing, manipulating, and managing geo-fences by a user or third party entity.

Geocoding can include the process of finding associated geographic coordinates (often expressed as latitude and longitude) from other geographic data, such as street addresses, or postal codes. With geographic coordinates the features can be mapped and entered into Geographic Information Systems (GIS), or the coordinates can be embedded into media such as digital photographs via geotagging. In one non-limiting example, geocoding includes address interpolation, which include the use of data from a street GIS where the street network is already mapped within the geographic coordinate space. Each street segment is attributed with address ranges (e.g. house numbers from one segment to the next). Geocoding takes an address and matches it to a street and specific segment (such as a block, in towns that use the "block" convention). Geocoding is then used to interpolate the position of the address within the range along the segment. In certain embodiments, privacy management framework 120 can be accessed by IP connected device 105 to set privacy parameters to control how geolocation data is used in creating, accessing, manipulating, and managing geo-coding by a user or third party entity.

Geotriggers can include geographic boundaries based on temporal distances. Geo-trigger transmission systems typically broadcast (e.g., delivers, distributes, etc.) data and/or messages (e.g., SMS, email, alerts, data files, etc.) to GPS-enabled computing devices (e.g., IP connected device 105) or trigger an action (e.g., telematics) via computing device as they cross and enter geo-trigger boundaries. A geo-trigger boundary may represent a travel time (e.g., 5 minutes via motor vehicle) from the boundary to a reference point. In some implementations, privacy management framework 120 can be accessed by IP connected device 105 to set privacy parameters to control how geolocation data is used in creating, accessing, manipulating, and managing geo-triggers by a user or third party entity.

Geoenrichment is the process of adding additional context to geographic points, shapes or zones. Geoenrichment can provide access to a wealth of information about people, places and businesses in the geographic areas that may be important to a person, business or organization. Some examples of geoenrichment includes enriching maps with demographic and lifestyle layers describing income, age, market potential, consumer behavior, and more. For example, demographic and lifestyle data variables (attributes) can be appended to spreadsheet data or other working documents, and interactive infographics can be added to maps to show demographic and lifestyle characteristics for a particular area. In some embodiments, privacy management framework 120 can be accessed by IP connected device 105 to set privacy parameters to control how geolocation data is used in creating, accessing, manipulating, and managing aspects of geoenrichment by a user or third party entity.

Geocloaking allows users, defined user groups (e.g., including families, work groups, etc.), and/or some other defined social unit or network, to modify, hide, disguise, scramble, or otherwise alter the past, present, or projected location of an IP-connected device or devices. In some implementations, privacy management framework 120 can be accessed by IP connected device 105 to set privacy parameters to control how geolocation data is used in creating, accessing, manipulating, and managing aspects of geocloaking by a user or third party entity.

Location data accuracy can control the accuracy of a reported location of, e.g., and IP connected device 120. For example, a person may want to allow a spouse to pinpoint their exact location (i.e., location of IP connected device 105) at any time, but limit their location information to County or city level resolutions for friends and extended family. Thus, through the user interface of privacy management framework 120, the person can individually manage and/or limit how their location information is delivered to each person, group, or organization that is granted access.

Location data reporting frequency can control how often location data, or derivatives thereof (e.g., location history), are reported to a person (e.g., device 105) or group (e.g., multiple devices 105). Thus, through the user interface of privacy management framework 120, a person can individually manage and/or limit how frequent their location information is delivered to each person, group, or organization that is granted access.

One aspect of selective disabling of location tracking includes limiting access to a user's location data for predetermined period of time. For example, a person may wish to allow a spouse to track their location at any time of the day, but limit an employers access to his location data during normal work hours.

Geo-location information can be presented at a granular or non-granular level. For example, this can include sharing raw latitude/longitude coordinates, city, country, county, specific place names, future or past locations, and any other significant location update at a resolution defined by the user. This information can be shared at will, scheduled in advance, and/or triggered by a set of user entered-rules or code, e.g., through a user interface of privacy management framework 120. A user can further opt to render personal data anonymous, or anonymize and aggregate it.

In some embodiments, privacy management framework 120 can be used to manage a user's personal location history derived from geolocation data. User's and third parties granted access can visual location history through a user interface on an IP connected device, which allows users to search through location history, modify the location history, download the location history in bulk and export the modified location history to a third party service, together with a transaction history. Users can set privacy parameters that limit how much access third parties have to this data.

In certain embodiments, privacy management framework 120 can be configured to manage geolocation data to enable, limit, or disable pattern recognition capabilities based on a personal location history. To illustrate, a deviation from a typical location behavior over time constitutes location intelligence. Location intelligence can include location analysis and/or behavioral analysis. Location intelligence may be useful in the areas of health, alerting, intelligence, and the like. Pattern recognition is further discussed below.

FIG. 2 is a simplified flow diagram illustrating a method of managing data privacy parameters, according to an embodiment of the invention. Method 200 can be performed by processing logic that may comprise hardware (e.g., circuitry, dedicate logic, etc.), software (which is run on a general purpose computing system or a dedicated machine), firmware (embedded software), or any combination thereof. In some embodiments, method 200 can be performed by privacy management framework 120 of system 100 in FIG. 1.

At 210, method 200 begins with providing a user interface on an internet-protocol (IP) connected device. The user interface can be part of the privacy management framework 120. In some cases, the user interface can be a control panel used to set and manage data privacy parameters (e.g., permissions) for geolocation data and/or PII data on web, mobile, and IP-connected devices. In some embodiments, a user interface (e.g., privacy provisioning portal) can function as a task manager or control panel, which may include a server architecture for permissioning, deleting, and/or forwarding on data privacy parameters powered by a back-end private interface and/or cloud platform. In such cases, stored user information (e.g., on a server) changes according to the specifications of the privacy management system. Permissioning can include viewing, storing, consuming, responding to, and modifying privacy considerations for geolocation data on an IP-connected device.

In some embodiments, the user interface is a control panel operated by privacy management framework 120. Aspects of privacy management framework 120 can be operated on an IP-connected device, on a remote server network (e.g., LaaS platform), or a combination of both. IP-connected devices can include a mobile phone, notebook computer, tablet computer, netbook computer, personal digital assistant (PDA), or any suitable IP-connected device. Mobile applications 110 are installed on device 105 and operate to initiate the geo-location functions (e.g., navigation, geoenrichment, geocoding, etc.) described herein.

At 220, the user interface receives a user input corresponding to data privacy parameters. As described above, data privacy parameters can be set by a user to control how certain geolocation data is transferred and/or shared with third parties. For example, location data accuracy may be limited for third parties where the user wishes to grant access to their general location without precise coordinates. Data privacy parameters can be set by a user, by guests (i.e., other users) with granted access (e.g., by the user), or they can be automated (e.g., presets or computer controlled settings).

At 230, the user interface of privacy management framework controls a transferring of geo-location data to and from mobile applications on IP-connected device 105 based on the user input. As described above, once the data privacy parameters are defined by the user via the user interface of privacy management framework 120, the data privacy parameters are applied to geo-location data traffic to, from, and within IP-connected device 105. In some aspects, a change in one or more of the privacy parameters affects how geo-location data is provided to each of the plurality of applications. Data privacy parameters can affect myriad geolocation functions including, but not limited to, location data accuracy, location data reporting frequency, geofunctions including geofencing, geocoding, geotriggers, geoenrichment, or geocloaking, the granularity of personal data associated with geo-location data, personal history data, and more, as further discussed above.

It should be appreciated that the specific steps illustrated in FIG. 2 provides a particular method of managing data privacy parameters (e.g., permissions for geo-location data access, geo-cloaking settings, etc.), according to an embodiment of the present invention. Other sequences of steps may also be performed according to alternative embodiments. In certain embodiments, method 200 may perform the individual steps in a different order, at the same time, or any other sequence for a particular application. For example, alternative embodiments may include additional steps to define data privacy parameters, include additional functionality of privacy management framework, or incorporate multiple IP-connected devices. In some methods, the privacy management framework may be controlled by software on the IP-connected device, but operated on remote infrastructure (e.g., remote servers, cloud computing, etc.). Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Permissions to Track Location Data

FIG. 3 is a simplified diagram illustrating a user interface 300 (i.e. control panel) for managing privacy parameters for third party applications, according to certain embodiments of the invention. In this non-limiting example, a website-based control panel (user interface) is shown that includes a listing of editable data privacy parameters for various applications (apps) displayed on an IP-connected device including a reminder app 310, Tourism app 320, and automation app 330. In certain embodiments, the control panel is controlled by a privacy management framework, as described above with respect to FIGS. 1 and 2. The user interface can be generated by a remote server and accessible by the IP-connected device.

Alternatively, the user interface (i.e., control panel) can be generated and displayed by software, hardware, firmware, or a combination thereof, residing on the IP-connected device.

In certain embodiments, reminder application 310 can use a customer, user, organization, third party, or group's location in a pre-defined or user-defined zone to send a pre-defined or user-defined note or action when the user enters a pre-defined or user-defined trigger zone. The term "pre-defined" can mean being of or related to any of the aforementioned parties or entities. A trigger zone can be defined by an address, by choosing from a third party list of locations, or by performing a search of user-defined and third party defined lists of locations, points of interests or brands. In some implementations, a trigger zone can also be determined by the user or pre-defined by the application developer as a category of place. A trigger zone can be limited by the user, third party or application developer as a single location defined by a address, category or point-of-interest (POI) in a pre-defined or user-defined Level of Detail. The Level of Detail can be set by the user, third party or app developer at the neighborhood level, city, state, country or global level in the Privacy Management Framework settings exposed to the end user, organization, developer, or third party.

A note or message can be delivered to an entity party of the kind listed in the first sentence by any means, including, but not limited to push message, SMS, email, physical mail, alert, other device or web-app, server, third party, organization, group or other user. Additional places can be added or access can be revoked per user preference or through a bulk import by the application developer, organization third party or other user, provided that the end user has opted into or subscribed to these options, alerts or pieces of data. The editable data privacy parameters on the user interface allow a user to indicate which locations may access the users geolocation data to determine when they enter a given zone. On the back-end, the service can query for local store based on an external store database or third party data, or use the user's stored address data to deliver the reminder message. More generally, applications of this form can be built so that a user can add an address to the system, choose an address from a third party database, and get any kind of notification when arriving at any location or category of place in a given neighborhood, city, state, country or globally.

Tourism application 320 sends location-based notifications to the user based on a current location, according to some embodiments of the invention. Examples of location-based information can include civic, private, social or public information including, but not limited to, parks, buildings, points of interest, art and history. Additional information-types can be added or access can be revoked per user preference. Frequency can be modified based on user preferences, as well as Level of Detail options addressed above.

Automation application 330 accesses a user's location for the purposes of modifying, turning on or off a network-connected device including, but not limited to, an appliance or light switch, according to certain embodiments of the invention. For instance, the user, company, organization or group could set an address or set of addresses that can define a place such as home or work. Once a user enters or leaves this location or pre-defined set of locations, an action may be applied to the network-connected device. The editable data privacy parameter includes a user-selectable box that gives permission and grants access to the application for accessing the user's geolocation data to determine when to turn on and off the lights at the selected location (e.g., home). The applications depicted are for illustration purposes only. The function of each application and the extent of their access and use of geolocation data may vary as required.

Figure 4:
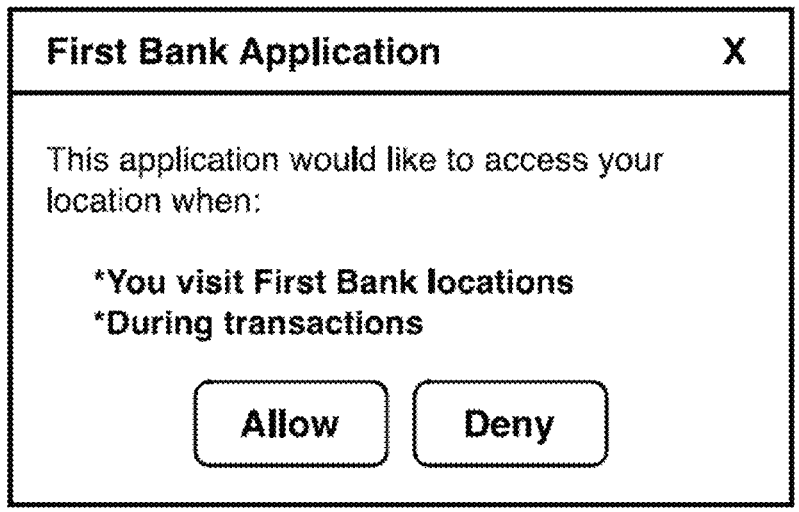
FIG. 4 is a simplified diagram illustrating a user interface for managing data privacy parameters for a third party application, according to certain embodiments of the invention.

FIG. 4 is a simplified diagram illustrating a user interface 400 (i.e. control panel) for managing privacy parameters for a third party application, according to certain embodiments of the invention. User interface 400 shows an authentication screen requesting permission to share user information with the application. In this non-limiting example, a website-based control panel is shown that includes an editable data privacy parameter (i.e. permissions) for allowing a bank to access your location when you visit their locations and during bank transactions. In certain embodiments, the control panel is controlled by a privacy management framework, as described above with respect to FIGS. 1 and 2. The user interface can be generated by a remote server and accessible by the IP-connected device. Alternatively, the user interface (i.e., control panel) can be generated and displayed by software, hardware, firmware, or a combination thereof, residing on the IP-connected device.

Figure 5:
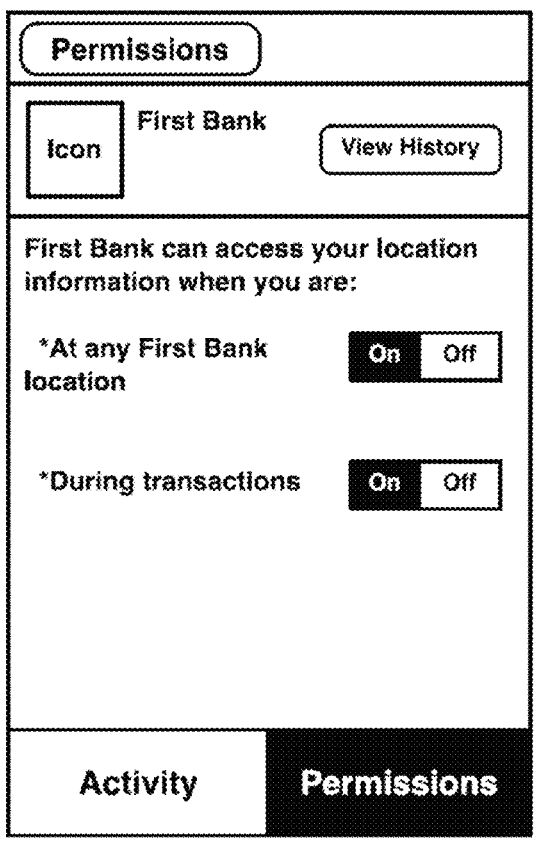
FIG. 5 is a simplified diagram illustrating a user interface for managing data privacy parameters for a third party application, according to certain embodiments of the invention.

FIG. 5 is a simplified diagram illustrating a user interface 500 (i.e. control panel) for managing data privacy parameters for third party applications, according to certain embodiments of the invention. User interface 500 is another embodiment of an application management tool to grant or deny geolocation data access (i.e. manage permissions) to the bank during bank visits or bank transactions. More generally, the application provides access to your current geolocation for selected third parties so allow them to provide geo-location related functions and services. It should be noted that other embodiments may include more data privacy parameters including limiting the accuracy of the geolocation data, or other information related to the provide services. For example, third-party opt-in permission can apply to a geofenced area(s), time of day, or condition.

The user interfaces described herein enable the tracking and/or controlling of what individuals each get to see. For example, during the hours of 6 p.m.-7 p.m., embodiments can be configured to allow a spouse, child, and good friend to track the location of person (i.e., IP connected device) in real-time. During 9 AM-5 PM, other individuals can see whether person is at work. Similarly, a user can see when his/her child is at school, real-time location of child between school and home, and/or real-time location of spouse between work and home. In addition, a user can simply choose the option of "notify me when spouse is 10 minutes away from home" via SMS, push, etc.

Figure 6:
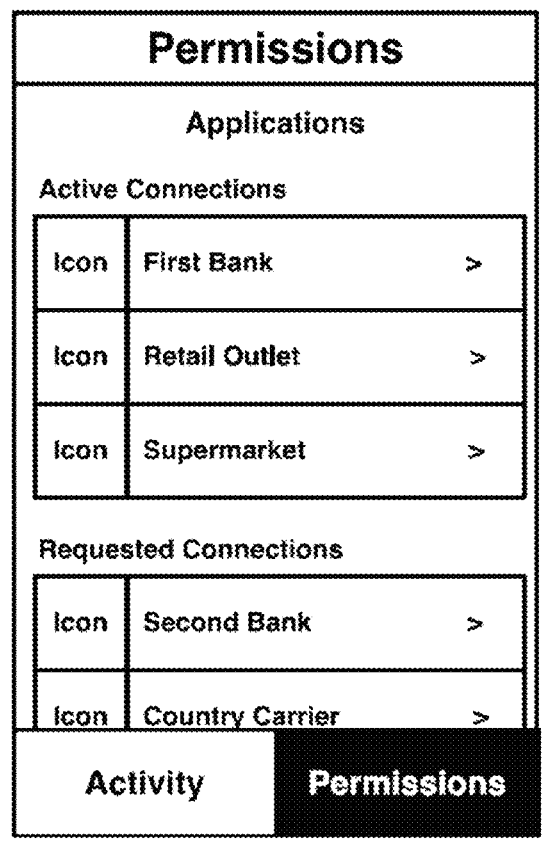
FIG. 6 is a simplified diagram illustrating a user interface for managing data privacy parameters for third party applications, according to certain embodiments of the invention.

FIG. 6 is a simplified diagram illustrating a user interface 600 (i.e. control panel) for managing privacy parameters for third party applications, according to certain embodiments of the invention. In this non-limiting example, a website-based user interface 600 is shown that displays current activity and permissions for third party entities. For example, certain entities (e.g., banks, retails outlets, supermarkets) currently have active connections and established permission to track a user's present location. Other entities (e.g., second bank, country carrier) have requested connections (request permission) to access a user's location (i.e., geolocation data). More generally, the application provides access to your current geolocation for selected third parties so allow them to provide geo-location related functions and services. It should be noted that other embodiments may include more data privacy parameters including limiting the accuracy of the geolocation data, or other information related to the provide services. In certain embodiments, the control panel is controlled or operated by a privacy management framework, as described above with respect to FIGS. 1 and 2. The user interface can be generated by a remote server and accessible by the IP-connected device. Alternatively, the user interface (i.e., control panel) can be generated and displayed by software, hardware, firmware, or a combination thereof, residing on the IP-connected device.

Figure 7:
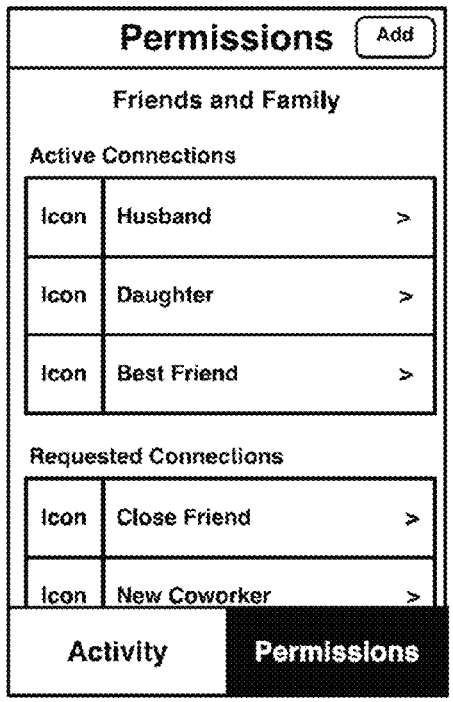
FIG. 7 is a simplified diagram illustrating a user interface for managing data privacy parameters for friends and family, according to certain embodiments of the invention.

FIG. 7 is a simplified diagram illustrating a user interface 700 (i.e. control panel) for managing privacy parameters for friends and family, according to certain embodiments of the invention. In this non-limiting example, a website-based user interface 700 is shown that displays current activity and permissions for friends and family, with active connections and established permission (i.e., data privacy parameter) for the user's husband, daughter, and best friend to track a user's present location. Other persons (e.g., close friend, new coworker) have requested connections (request permission) to access the user's location (i.e., geolocation data). More generally, the application provides access to your current geolocation for selected third parties so allow them to provide geo-location related functions and services. Certain embodiments may employ a social permission interface (e.g., user interface) allowing the user to share pre-defined or user-defined aspects of one's location with specific people, either pre-defined or named by the individual. The user interface can provide an option to the user to see a history of location sharing and the ability to easily add permissions and new rules for people and places. It should be noted that other embodiments may include more data privacy parameters including limiting the accuracy of the geolocation data, or other information related to the provide services. In certain embodiments, the control panel is controlled or operated by a privacy management framework, as described above with respect to FIGS. 1 and 2. The user interface can be generated by a remote server and accessible by the IP-connected device. Alternatively, the user interface (i.e., control panel) can be generated and displayed by software, hardware, firmware, or a combination thereof, residing on the IP-connected device.

Figure 8:
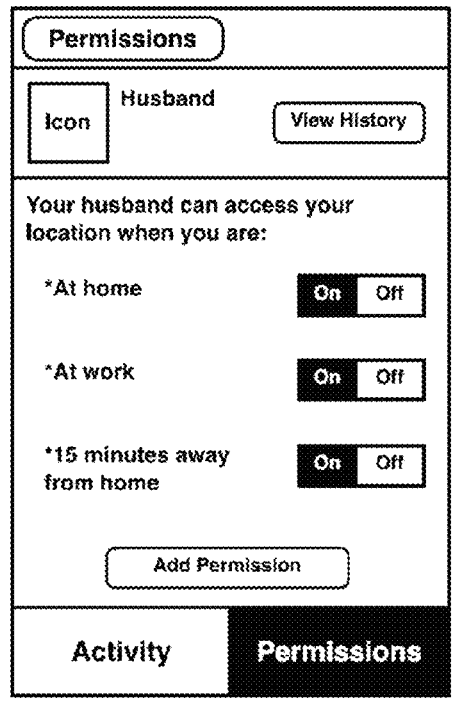
FIG. 8 is a simplified diagram illustrating a user interface for managing data privacy parameters for friends and family, according to certain embodiments of the invention.

FIG. 8 is a simplified diagram illustrating a user interface 800 (i.e. control panel) for managing privacy parameters for friends and family, according to certain embodiments of the invention. In this non-limiting example, a website-based user interface 800 is shown that displays current activity and permissions for friends and family, with active connections and established permission (i.e., data privacy parameter) for the user's husband to track a user's present location when at home, at work, or 15 minutes away from home. In some cases, additional permissions can be added. For example, a user may want to allow their husband to also track them when they are near their child's school. Some embodiments may also allow a user to view a permission history which can show what permissions were allowed in the past and when those various conditions (e.g., husband at home, work, etc.) were met. More generally, the application provides access to your current geolocation for selected third parties so allow them to provide geo-location related functions and services. It should be noted that other embodiments may include more data privacy parameters including limiting the accuracy of the geolocation data, or other information related to the provide services. In certain embodiments, the control panel is controlled or operated by a privacy management framework, as described above with respect to FIGS. 1 and 2. The user interface can be generated by a remote server and accessible by the IP-connected device. Alternatively, the user interface (i.e., control panel) can be generated and displayed by software, hardware, firmware, or a combination thereof, residing on the IP-connected device.

Geo-Cloaking

As described above, geocloaking allows users, defined user groups (e.g., including families, work groups, etc.), and/or some other defined social unit or network, to modify, hide, disguise, scramble, or otherwise alter the past, present, or projected location of an IP-connected device or devices. In some embodiments, a user or user group can select a privacy setting so that blind spots (or privacy zones) are defined, on a per-application basis, for applications gathering location data from an IP-connected device. However, the application continues to gather location data (i.e., its location tracking is not turned off), but will fail to report these blind spots or privacy zones. Instead, the application can either interpolate between two non-blind spots or privacy zones with a spoofed route and report it out, or will report the location prior to entering the blind spot until the user has traveled back out of it. In some embodiments, the privacy settings for geocloaking can be set by a user interface and controlled by a privacy management framework.

In some implementations, user groups can create a Temporary Autonomous Zone (TAZ), a dynamically-generated blind spot or privacy, as defined above, produced for two or more IP-connected devices predefined as members of a TAZ. The TAZ can be initiated when the devices signal their proximity to one another, and lasts as long as the devices maintain that proximity. The user can temporarily cache location data in an IP-connected device before it is reported to applications authorized to use it. This temporary cache operates analogously to a tape-delay. Within the defined delay timeframe, the user can access the stored location data by means of an interface, and edit or delete it before it is reported. The user, by means of an interface, can clear all cookies and other tracking tools associated with a geofence or other location. The user can be alerted to the presence of geofences before crossing through them, and may be offered the option of disabling location tracking of an IP-connected device or devices before doing so. A user can deny contextual location data about ingress or egress to or from a geofence, so that an application on an IP-connected device authorized to communicate with a second party within a geofence is prevented from reporting the location of the device before or after its authorized, geofence-specific interaction.

In further embodiments, a user can spoof false or incomplete location data from an IP connected device or devices so as to prevent human or automated location tracking (e.g., including ad network tracking, cookies, etc.), or other forms of location intelligence gathering. This includes geoventriloquism, whereby an IP-connected device is made to be observed by automated or human trackers at an apparent location other than its actual one, including the location of a different IP connected device. In some cases, a user group can define and implement a randomized, peer-to-peer exchange of location data, so as to inhibit human or automated location tracking, or other forms of location intelligence gathering.

Figure 9:
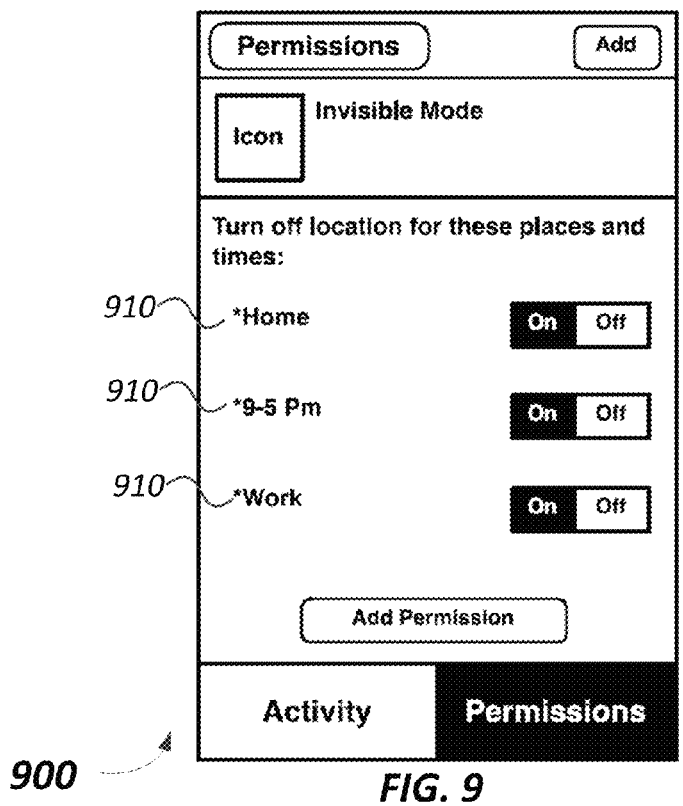
FIG. 9 is a simplified diagram illustrating a user interface for managing data privacy parameters, according to certain embodiments of the invention.

FIG. 9 is a simplified diagram illustrating an example of a geocloaking interface (user interface 900) for managing privacy parameters, according to certain embodiments of the invention. More specifically, user interface 900 is a geocloaking interface whereby a user can toggle an invisible mode on and off and restrict access to one's location when they are at certain pre-defined or user-defined places and times. In this non-limiting example, a website-based user interface 900 is shown that indicates certain assignable and selectable locations 910 (e.g., home, 9-5 p.m., work) where a user enters into an invisible mode (i.e., geocloaking mode) that blocks access to one's geo-location (i.e., data privacy parameter). In certain embodiments, the control panel is controlled or operated by a privacy management framework, as described above with respect to FIGS. 1 and 2. The user interface can be generated by a remote server and accessible by the IP-connected device.

Alternatively, the user interface (i.e., control panel) can be generated and displayed by software, hardware, firmware, or a combination thereof, residing on the IP-connected device.

Examples of Geolocation Data Sharing, Settings, and Management

FIG. 10 is a simplified diagram illustrating an example of an application management interface (user interface 1000), according to certain embodiments of the invention. More specifically, user interface 1000 can be used to view and/or manage aspects of certain software applications on, e.g., an IP connected device. Interface 1000 allows a user to sort applications by an indicated rating 1010, battery life 1020, privacy rating 1030, and popularity (not shown).

Battery life can be significantly reduced in electronic devices (e.g., IP connected device 105) utilizing GPS technologies, which may include sending/receiving geolocation data. Applications with frequent GPS tracking may tend to consume more power than applications with more infrequent use. For instance, grocery app 1040 only tracks your location (i.e., requests access to geolocation data) when a user enters a specified grocery store, thus having minimal battery use. In contrast, Wikipedia app 1060 tracks your location anytime a Wikipedia article relevant to your local area is available, thus presumably having more frequent battery use.

Privacy rating 1030 indicates how much relative geolocation data and/or personally identifiable information is utilized with respect to other applications. With grocery app 1040, the application may only request a user's location when they enter into one or more specified grocery stores. Thus, requests are infrequent and the amount of personal data associated with the request is relative low since very specific geo-location data is required and PII information can be low (e.g., shopping habits, etc.). With the Wikipedia app 1060, location data is requested more frequently (depending on the number of local articles) and more user behavioral data (e.g., PII data) may be gleaned as a result, including more frequent access to a user's location and whereabouts, information regarding a user's news and reading preferences, as well as demographic information that than be gleaned therefrom.

Figure 11:
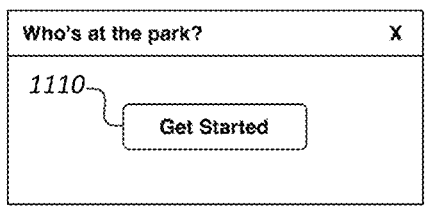
FIG. 11 is a simplified diagram illustrating an example of an application start screen including a location privacy opt-in interface, according to certain embodiments of the invention.

FIG. 11 is a simplified diagram illustrating an example of an application start screen (i.e., user interface 1100) including a location privacy opt-in interface, according to certain embodiments of the invention. In this example, the application allows a user to know when third parties (e.g., friends, family, colleagues, etc.) are at a given park. User interface 1000 prompts the user to begin the process of establishing a contact/permission list by pressing the "get started" button. It should be noted that although a certain process of establishing a permission/privacy based network is shown in a specific way, embodiments can be implemented in any number of ways as would be appreciated by one of ordinary skill in the art with the benefit of this disclosure.

Figure 12:
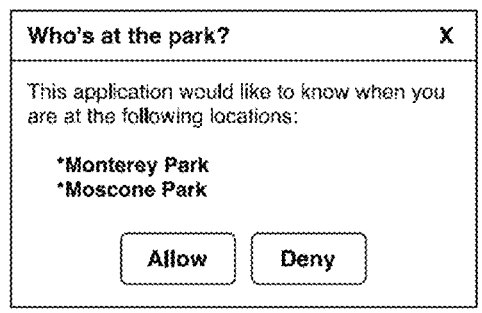
FIG. 12 is a simplified diagram illustrating an example of a user interface showing an application name and opt-in dialogue to show users which locations the application will access the user's location, according to certain embodiments of the invention.

FIG. 12 is a simplified diagram illustrating an example of a user interface 1200 showing an application name and opt-in dialogue to show users which locations the application will access the user's location, according to certain embodiments of the invention. More specifically, user interface 1200 queries the user to allow or deny access to the application to know the user's geolocation when she is near one of a number of parks.

Figure 13:
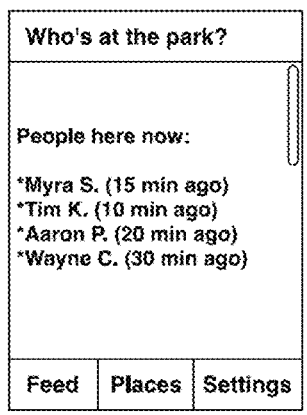
FIG. 13 is a simplified diagram illustrating an example of a user interface on an IP-connected mobile device featuring social information displayed by the application when a user logs into the application, according to certain embodiments of the invention.

FIG. 13 is a simplified diagram illustrating an example of a user interface 1300 on an IP-connected mobile device featuring social information displayed by the application when a user logs into the application, according to certain embodiments of the invention. Social information can be time stamped when software detects the user's location enters a designated region or zone that is predefined or user-defined by the application. In this case, the application identifies when the user is at a specified park and indicates when other preselected people (i.e., their IP-connected devices) are presently located at the park.

Figure 14:
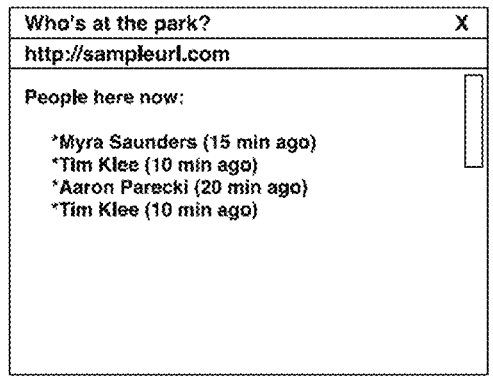
FIG. 14 is a simplified diagram illustrating an example of a user interface configured to share social information with a user based on the user's permissions and the location-based permissions of others they are connected to, according to certain embodiments of the invention.
Figure 15:
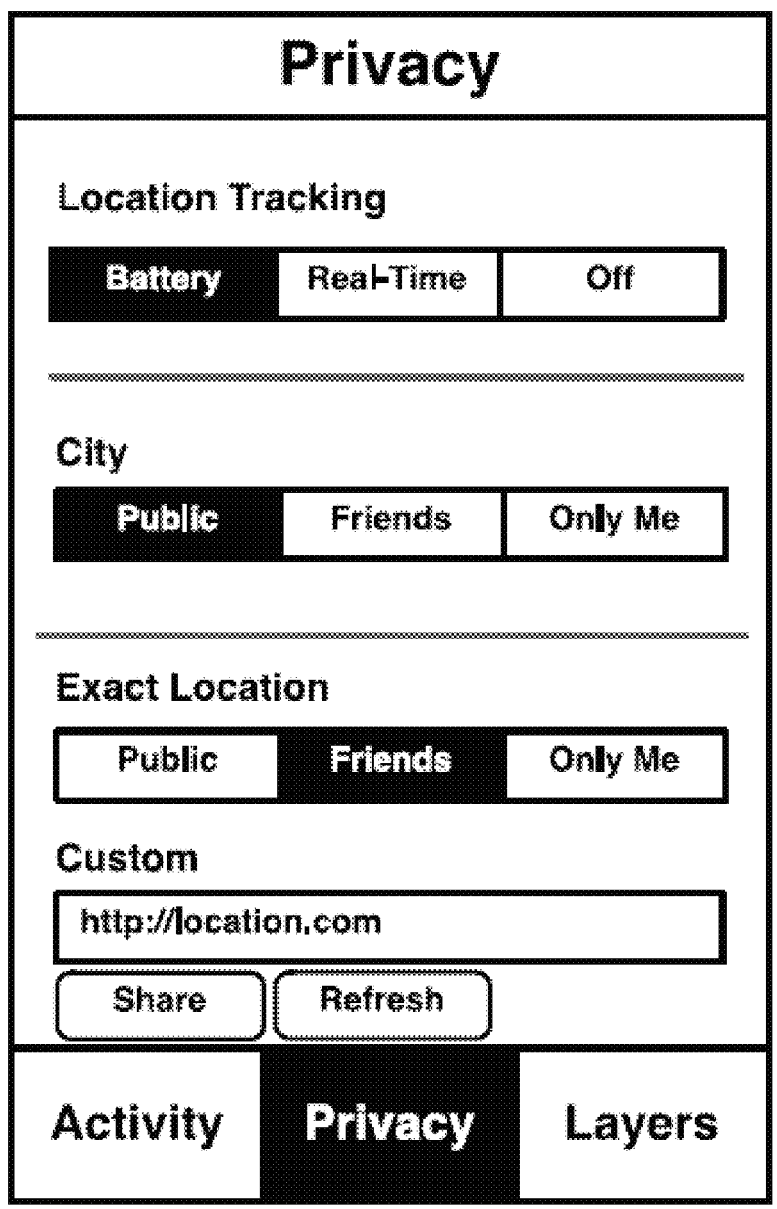
FIG. 15 is a simplified diagram illustrating an example of a user interface displaying a sample privacy permission screen for a mobile IP-connected device allowing users to set location-tracking frequency, resolution of data shared, and/or custom links for sharing the user's exact location, according to certain embodiments of the invention.

FIG. 14 is a simplified diagram illustrating an example of a user interface 1400 (i.e., web-based interface) configured to share social information with a user based on the user's permissions and the location-based permissions of others they are connected to, according to certain embodiments of the invention. FIG. 15 is a simplified diagram illustrating an example of a user interface 1500 displaying a sample privacy permission screen for a mobile IP-connected device allowing users to set location-tracking frequency, resolution of data shared, and/or custom links for sharing the user's exact location, according to certain embodiments of the invention.

In some embodiments, graphs can display a history of information gathered by the system for a user. User can opt-in or opt-out at will, which can include opting out of third party or social location sharing at a user defined set of places, for geofences, times of the day, speeds, or other user-defined variables. User can hide themselves, or record location history only for personal use when at a set of user defined places (including points of interest, cities and user-defined locations), times, or other user-defined variables or when other criteria are met.

In further embodiments, a user can trigger location sharing to automatically occur when sufficient criteria have been met such as a user-defined trigger zone, place, point of interest, city, time limit, schedule, and/or other user-defined data. In one non-limiting example, a user can share their location when they arrive at an airport with a pre-defined group of people, publically or privately (and still be stored in user history), to a third party, and/or to a wider social network. Alternatively, or in addition to, fulfilling certain criteria can allow one's location to be shared in real time with others when a user is a certain amount of time away from a given location such as home or work.

Location History Tracking and Management

FIG. 16 is a simplified diagram illustrating a user interface 1600 depicting a user location history, according to certain embodiments of the invention. User interface displays a number of visited establishments 1610 and a historical account 1620 of when the user visited establishment. In some embodiments, user interface 1600 can be displayed on an IP connected mobile device. FIG. 17 illustrates another user interface 1700 depicting a location history in a web-based browser, according to certain embodiments of the invention. By visualizing location history through a user interface on an IP connected device, users can search through location history, modify the location history, download the location history in bulk and export the modified location history to a third party service, or the like. In some cases, third parties can be granted access to a user's location history.

Various embodiments of the invention can utilize GIS and/or geolocation based services with a privacy management framework for IP connected devices can use location as a contextual input for determining pattern recognition including significant location behavior and behavioral analysis. For example, deviation from regular location behavior (i.e., established pattern recognition) over time can constitute location intelligence. Location intelligence may include or otherwise be referred to as location analysis and/or behavioral analysis. Location intelligence can be useful in the areas of health, alerting, intelligence, economic/social behavior, and the like.

Location intelligence can be provided either to the user specifically by means of export, output, application programming interface (API) or other database query, or can be provided to a third party. There is a social analysis of location behaviors, which could be used for, but not limited to, advertising purposes. In some embodiments, a back-end interface (e.g., server-based interface accessible by an IP-connected device via a privacy management framework) can be configured for gathering location intelligence, which can be routed to pertinent parties, health related organizations, etc. In one non-limiting example, a user device may have a certain trigger for movements, which can be indicative of physiological behaviors, e.g., Alzheimer's, dementia, schizophrenia. This may be determined by a change in movement or behavior over time, thereby allowing a third party to see the person's location and then report it to an appropriate party. In another example, an amount of time spent in a particular place may signal a physiological condition such as depression for certain individuals, or alternatively, a 25% change in behavior over time may provide early indicators of psychological conditions. Location intelligence can provide these indicators and more across any number of fields, interests, and disciplines, as would be appreciated by one of ordinary skill in the art.

Figure 18:
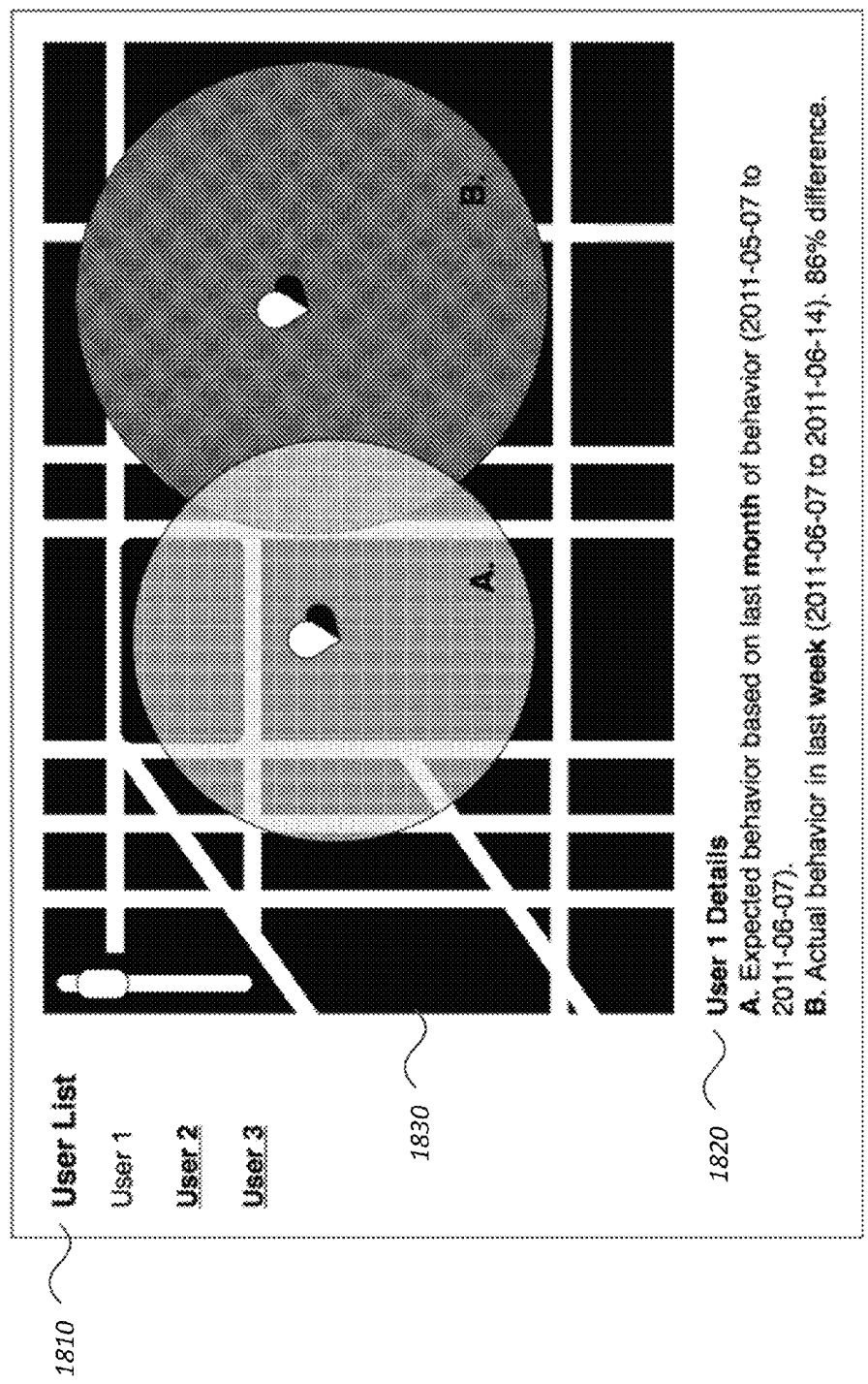
FIG. 18 is a simplified diagram illustrating a user interface to analyze and predict user behavior based on location data, according to certain embodiments of the invention.

FIG. 18 is a simplified diagram illustrating a user interface 1800 to analyze and predict user behavior based on location data, according to certain embodiments of the invention. User list 1810 indicates a number of users associated with the applications, including User 1, User 2, and User 3. Display 1830 and user details 1820 indicate location behavior for user 1 over time. For example, location A indicates an expected (i.e., calculated) location-based behavior based on geolocation data during the previous month. Location B indicates an actual location-based behavior within the last week and indicates an 86% change in the user 1's location-based behavioral pattern. Such changes may indicate changes in shopping preferences, activities, employment status, medical status, or other information as would be appreciated by one of ordinary skill in the art with the benefit of this disclosure.

Example of a System Configured for Real-time Location Provisioning

Figure 19:
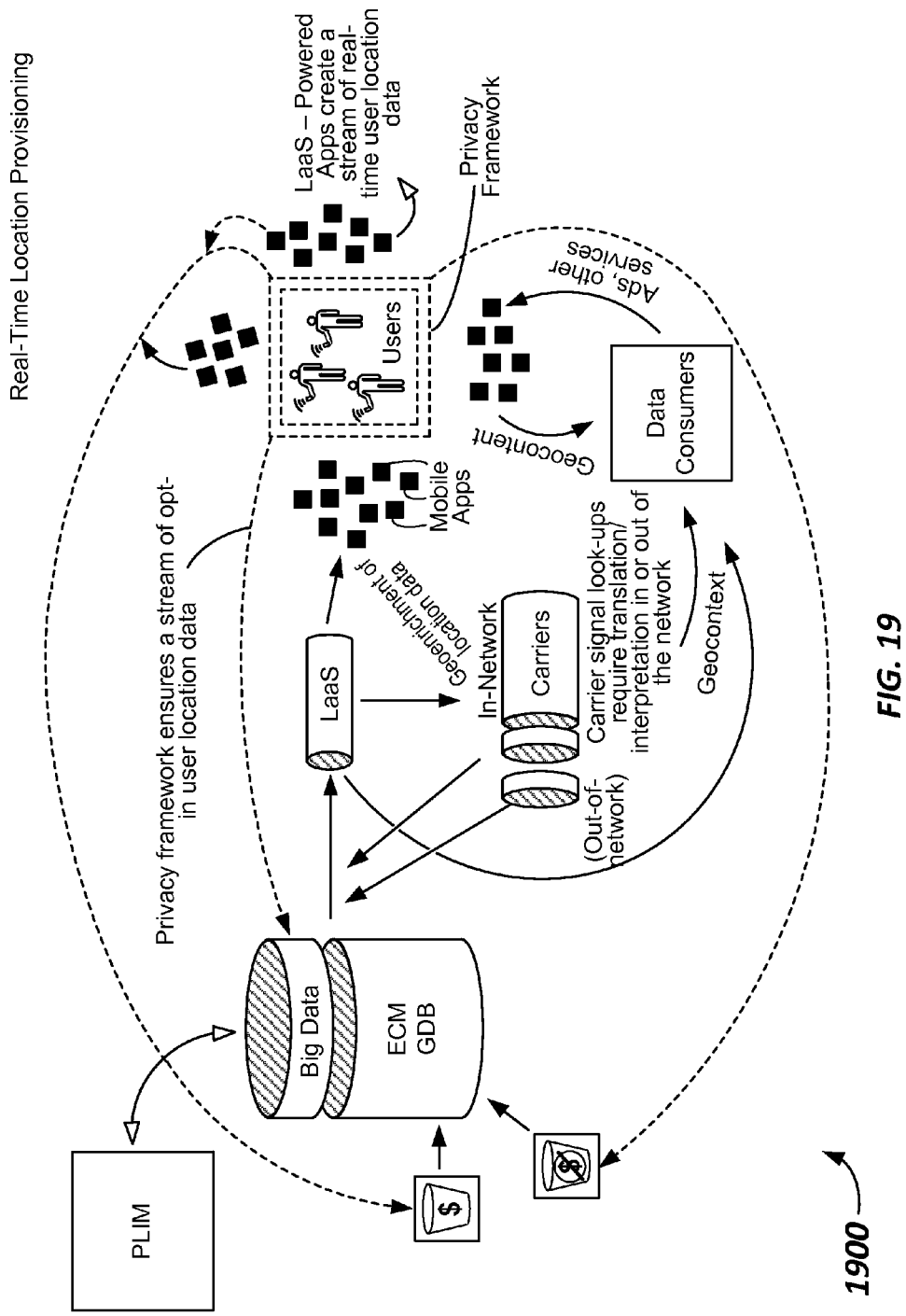
FIG. 19 is a simplified diagram illustrating real-time location provisioning in a system 1900 for managing location data utilizing a privacy framework, according to certain embodiments of the invention.

FIG. 19 is a simplified diagram illustrating real-time location provisioning in a system 1900 for managing location data utilizing a privacy framework, according to certain embodiments of the invention. Typically, all IP-connected devices produce location data. Mobile IP-connected devices may produce persistent streams of such data that can be used to monitor an individual's movements from place to place by a variety of methods (e.g., via cell tower triangulation, GPS sniffing, wifi ID, geo-tagged photographs, social media check-ins, etc.), either in real time, or as analyzed in historical batches. Because of its value to a growing number of Data Consumers (e.g., mobile advertising, insurance companies, the intelligence community), all of these methods are currently being exploited. As a consequence, location privacy has become an increasingly sensitive issue for consumers. In many cases where a mobile IP-connected device produces consumer location data that is made use of by Location Based Services (LBS), the device and the services can be intermediated by the Privacy Management Framework (PMF) for purposes of consumer protection, and as an incentive to participate in a more symmetrical location-sharing economy. In an embodiment where the privacy framework is pre-installed on its consumer devices by a telecommunications (Telco) company, the Telco can offer a Telco-Certified app program—positively adjusting consumer incentives for using certain applications rather than others, and increasing confidence in the use of their location data (i.e., the data management is self-determined and transparent). Some implementations may also include a consumer-facing mapping and navigation application, a geo-triggered offer/advertising platform, tools for M2M (machine-to-machine) transactions (e.g., the "internet of things") or other location sensitive/aware apps pre-installed on handsets by the carrier that are all natively integrated with the PMF. Apps integrated with the PMF typically produce streams of hygienic (i.e., "opted-in") location data of two main types—direct and indirect. Direct streams report location without passing through a third party app (e.g., use of a pre-installed consumer map, or a family tracking app offered by the Telco as a paid service). Indirect streams first pass through a third party app (e.g., a social networking app whose check-ins the user authorizes to be shared publicly, or for advertising purposes). Because of its interoperation with the backend LBS (e.g. LaaS) platform, and its integration with the frontend apps (whether those pre-installed by the carrier or those developed by some third party), the PMF enables the Telco to participate in the collection of both stream types in each case where the Telco has been authorized to do so by the user.

In some embodiments, FIG. 19 includes a Personal Location Information Model (PLIM) upon which historical location profiles granular to the scale of individuals are built. The PLIM can be used to inform location searches with temporal parameters, behavioral analytics, geocontextual advertising, and other location-sensitive operations which require the use of stored data. It should be noted that the PLIM is only an information model. The availability of such data—its degree of anonymity and/or aggregation, its frequency of expiration, and so forth, can determined by end-user inputs to the Privacy Management Framework, and is enforced by rules governing the system's components.

Figure 20:
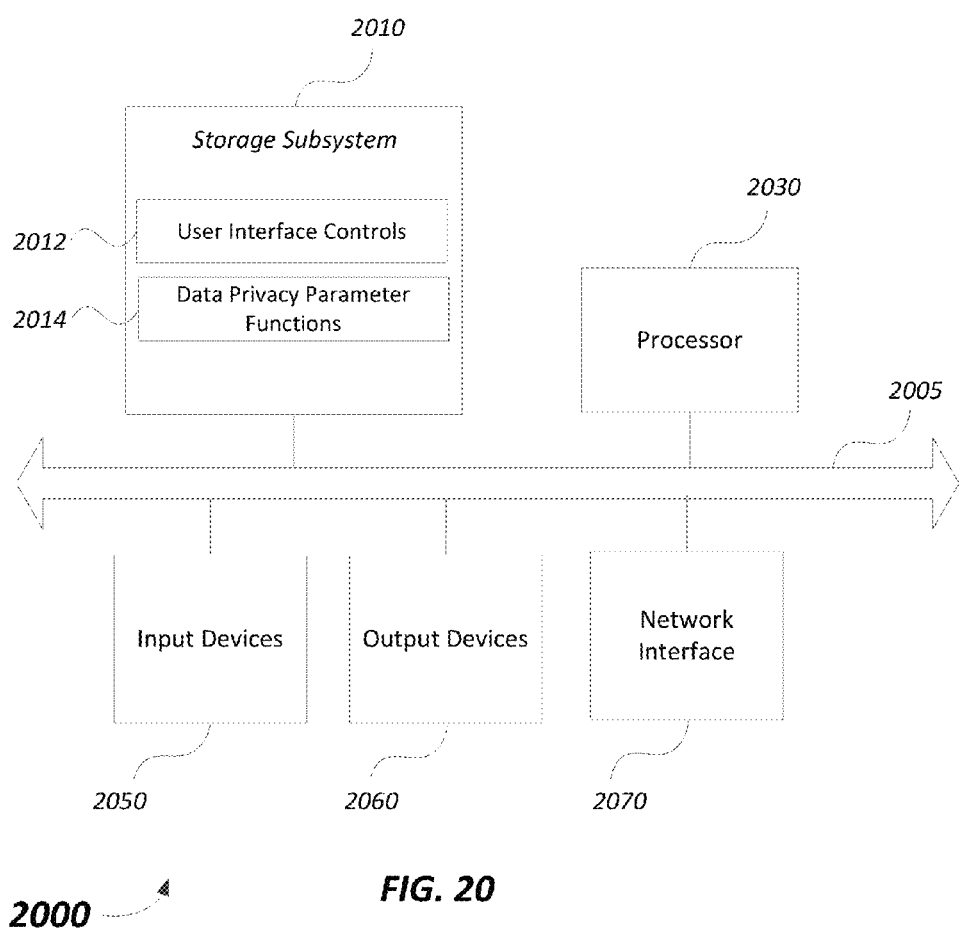
FIG. 20 illustrates a computer system for implementing a privacy management framework, according to an embodiment of the invention.

FIG. 20 illustrates a computer system 2000 for implementing a privacy management framework, according to an embodiment of the present invention. The privacy management framework described herein (e.g., FIGS. 1-19) can be implemented in whole or in part by a computer system such as computer system 2000 shown here. Computer system 2000 can be implemented as any of various computing devices, including, e.g., a desktop or laptop computer, tablet computer, smart phone, personal data assistant (PDA), or any other type of computing device, not limited to any particular form factor. Similarly, computer system 2000 can be implemented on a server computer, computer cluster, or the like. Computer system 2000 can include processing unit(s) 2030, storage subsystem 2010, input devices 2050 (e.g., keyboards, mice, touchscreens, etc.), output devices 2060 (e.g., displays, speakers, tactile output devices, etc.), network interface 2070 (e.g., RF, 4G, EDGE, WiFi, GPS, Ethernet, etc.), and bus 2005 to communicatively couple the various elements of system 2000 to one another.

Processing unit(s) 2030 can include a single processor, multi-core processor, or multiple processors and may execute instructions in hardware, firmware, or software, such as instructions stored in storage subsystem 2010. The storage subsystem 2010 can include various memory units such as a system memory, a read-only memory (ROM), and permanent storage device(s) (e.g., magnetic, solid state, or optical media, flash memory, etc.). The ROM can store static data and instructions required by processing unit(s) 2030 and other modules of system 2000. The system memory can store some or all of the instructions and data that the processor needs at runtime.

In some embodiments, storage subsystem 2010 can store one or more software programs to be executed by processing unit(s) 2030, such as user interface controls 2012, data privacy parameter management functions 2014, and the like, as further described above with respect to FIGS. 1-19. As mentioned, "software" can refer to sequences of instructions that, when executed by processing unit(s) 2030, cause computer system 2000 to perform certain operations of the software programs. The instructions can be stored as firmware residing in read-only memory and/or applications stored in media storage that can be read into memory for processing by processing unit(s) 2030. Software can be implemented as a single program or a collection of separate programs and can be stored in non-volatile storage and copied in whole or in part to volatile working memory during program execution. From storage subsystem 2010, processing unit(s) 2030 can retrieve program instructions to execute in order to execute various operations (e.g., user interface operations) described herein.

It will be appreciated that computer system 2000 is illustrative and that variations and modifications are possible. Computer system 2000 can have other capabilities not specifically described here (e.g., mobile phone, global positioning system (GPS), power management, one or more cameras, various connection ports for connecting external devices or accessories, etc.). Further, while computer system 2000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 21:
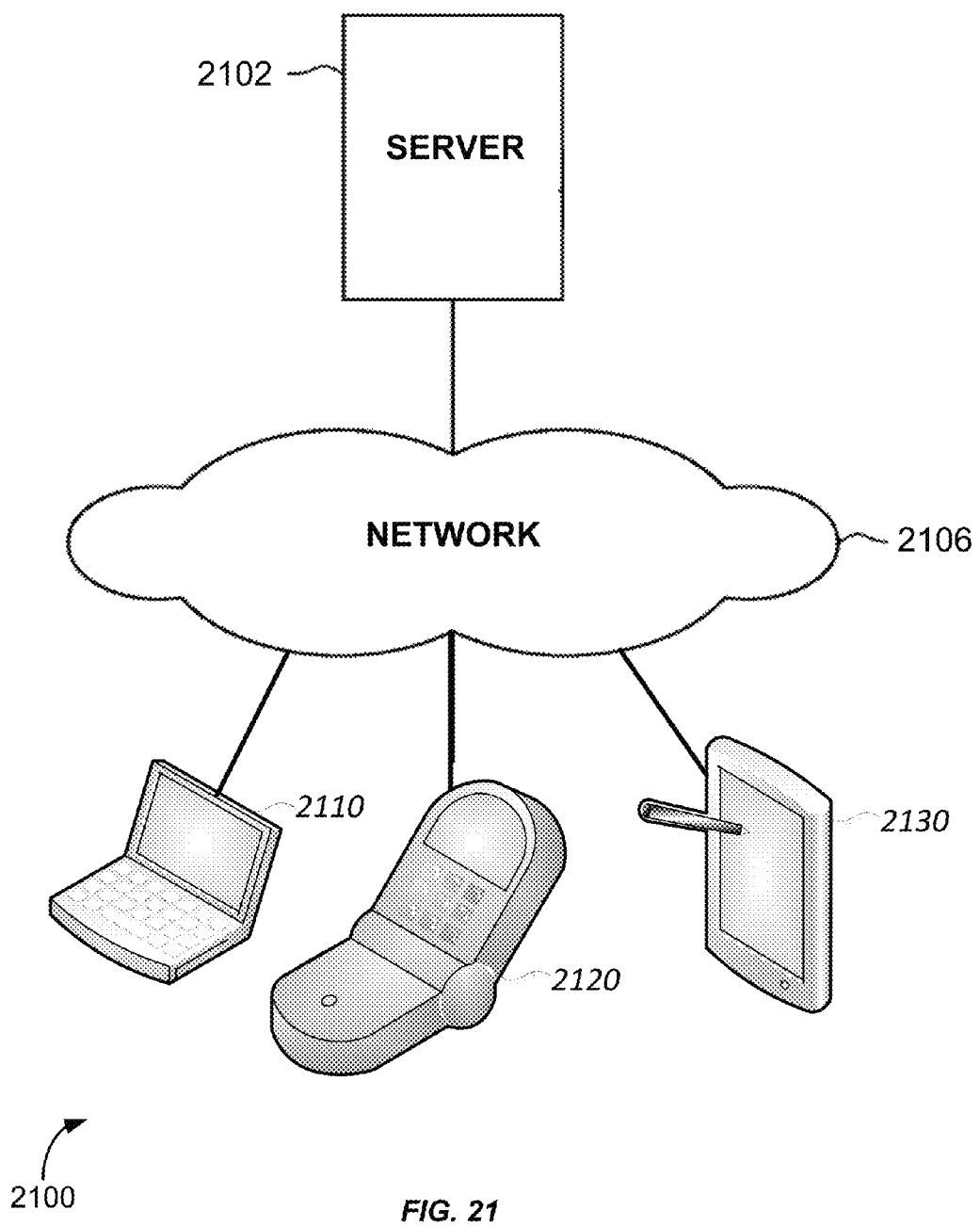
FIG. 21 depicts a simplified diagram of a distributed system for providing a system and method for implementing a privacy management framework, according to an embodiment of the invention.

Aspects of system 2000 may be implemented in many different configurations. In some embodiments, system 2000 may be configured as a distributed system where one or more components of system 100 are distributed over one or more networks in the cloud. FIG. 21 depicts a simplified diagram of a distributed system 2100 for providing a system and method for implementing a privacy management framework, according to an embodiment of the invention. In the embodiment depicted in FIG. 21, system 2100 is provided on a server 2102 that is communicatively coupled with one or more remote client devices 2110, 2120, 2130 via network 906.

Network 2106 may include one or more communication networks, which could be the Internet, a local area network (LAN), a wide area network (WAN), a wireless or wired network, an Intranet, a private network, a public network, a switched network, or any other suitable communication network or combination thereof. Network 2106 may include many interconnected systems and communication links including but not restricted to hardwire links, optical links, satellite or other wireless communications links, wave propagation links, or any communication protocol. Various communication protocols may be used to facilitate communication of information via network 2106, including but not restricted to TCP/IP, HTTP protocols, extensible markup language (XML), wireless application protocol (WAP), protocols under development by industry standard organizations, vendor-specific protocols, customized protocols, and others as would be appreciated by one of ordinary skill in the art. In the configuration depicted in FIG. 21, aspects of system 2100 may be displayed on any of client devices 2110, 2120, 2130.

In the configuration depicted in FIG. 21, system 2000 is remotely located from client devices 2110, 2120, 2130. In some embodiments, server 2102 may perform the methods of determining (or interpolating) a population over a geographic area described herein. In some embodiments, the services provided by server 902 may be offered as web-based or cloud services or under a Software as a Service (SaaS) model, as would be appreciated by one of ordinary skill in the art.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A computer-implemented method comprising:
providing, by a hardware processor, a user interface on an internet-protocol (IP) connected mobile device, the user interface configured to receive a user input corresponding to one or more data privacy parameters for geo-location data,
wherein the data privacy parameters affect geofunctions including geofencing, geotriggers and geoenrichment; and
controlling, by the hardware processor, a transferring of geo-location data to and from each of a plurality of mobile applications on the mobile device based on the user input.

2. The method of claim 1 wherein a change in one or more of the privacy parameters affects how geo-location data is provided to each of the plurality of applications.

3. The method of claim 1 wherein the data privacy parameters further affects one or more of location data accuracy and location data reporting frequency.

4. The method of claim 1 wherein controlling includes selectively disabling location tracking for one or more mobile applications for a predetermined period of time.

5. The method of claim 1 further comprising controlling a granularity of personal data associated with the geo-location data.

6. The method of claim 5 wherein the personal data is anonymized or anonymized and aggregated.

7. The method of claim 1 wherein the user interface is configured to a user to view or delete a personal location history.

8. The method of claim 1 wherein one or more profiles are associated with one or more of the plurality of mobile applications, wherein each of the one or more profiles is assigned individual data privacy parameters.

9. A computer-implemented system, comprising:
one or more hardware processors:

one or more non-transitory computer-readable storage mediums containing instructions configured to cause the one or more processors to perform operations including:
provide a user interface on an internet-protocol (IP) connected mobile device, the user interface configured to receive a user input corresponding to one or more data privacy parameters for geo-location data,
wherein the data privacy parameters affect geofunctions including geofencing, geotriggers and geoenrichment; and
controlling a transferring of geo-location data to and from each of a plurality of mobile applications on the mobile device based on the user input.

10. The system of claim 9 wherein a change in one or more of the privacy parameters affects how geo-location data is provided to each of the plurality of applications.

11. The system of claim 9 wherein the data privacy parameters further affects one or more of location data accuracy and location data reporting frequency.

12. The system of claim 9 wherein controlling includes selectively disabling location tracking for one or more mobile applications for a predetermined period of time.

13. The system of claim 9 further comprising controlling a granularity of personal data associated with the geo-location data.

14. The system of claim 9 wherein one or more profiles are associated with one or more of the plurality of mobile applications, wherein each of the one or more profiles is assigned individual data privacy parameters.

15. A non-transitory computer-program product, embodied in a machine-readable non-transitory storage medium, including instructions configured to cause a data processing apparatus to:
provide a user interface on an internet-protocol (IP) connected mobile device, the user interface configured to receive a user input corresponding to one or more data privacy parameters for geo-location data,
wherein the data privacy parameters affect geofunctions including geofencing, geotriggers and geoenrichment; and
control a transferring of geo-location data to and from each of a plurality of mobile applications on the mobile device based on the user input.

16. The computer-program product of claim 15 wherein a change in one or more of the privacy parameters affects how geo-location data is provided to each of the plurality of applications.

17. The computer-program product of claim 15 wherein the data privacy parameters further affects one or more of location data accuracy and location data reporting frequency.

18. The computer-program product of claim 15 wherein controlling includes selectively disabling location tracking for one or more mobile applications for a predetermined period of time.

19. The computer-program product of claim 15 further comprising controlling a granularity of personal data associated with the geo-location data.

20. The system of claim 15 wherein one or more profiles are associated with one or more of the plurality of mobile applications, wherein each of the one or more profiles is assigned individual data privacy parameters.

* * * * *